United States Patent
Gundur et al.

(10) Patent No.: US 10,993,085 B2
(45) Date of Patent: Apr. 27, 2021

(54) METHOD AND SYSTEM FOR NOTIFYING STATE OF MEMBERS OF MISSION CRITICAL SERVICE (MCX) GROUPS

(71) Applicant: Samsung Electronics Co., Ltd., Gyeonggi-do (KR)

(72) Inventors: Siva Prasad Gundur, Bangalore (IN); Vijay Sangameshwara, Bangalore (IN); Prakash Rao, Bangalore (IN); Sapan Pramod Kumar Shah, Bangalore (IN); Nishant Gupta, Bangalore (IN)

(73) Assignee: Samsung Electronics Co., Ltd

( * ) Notice: Subject to any disclaimer, the term of this patent is extended or adjusted under 35 U.S.C. 154(b) by 43 days.

(21) Appl. No.: 16/613,637

(22) PCT Filed: May 15, 2018

(86) PCT No.: PCT/KR2018/005575
§ 371 (c)(1),
(2) Date: Nov. 14, 2019

(87) PCT Pub. No.: WO2018/212571
PCT Pub. Date: Nov. 22, 2018

(65) Prior Publication Data
US 2020/0120454 A1 Apr. 16, 2020

(30) Foreign Application Priority Data

May 15, 2017 (IN) .............................. 201741017021
May 11, 2018 (IN) .............................. 201741017021

(51) Int. Cl.
*H04W 76/00* (2018.01)
*H04W 4/08* (2009.01)
(Continued)

(52) U.S. Cl.
CPC ........... *H04W 4/08* (2013.01); *H04L 65/1006* (2013.01); *H04L 65/1073* (2013.01); *H04L 65/403* (2013.01); *H04W 4/10* (2013.01)

(58) Field of Classification Search
CPC .. H04W 4/08; H04L 65/1006; H04L 65/1073; H04L 65/403
(Continued)

(56) References Cited

U.S. PATENT DOCUMENTS 10,462,291 B1 * 10/2019 Ravichandran ... H04M 3/42238
2013/0311871 A1 * 11/2013 Turner ................... G06Q 10/00
715/234

(Continued)

OTHER PUBLICATIONS

3rd Generation Partnership Project; Technical Specification Group Services and System Aspects; Study on Application Architecture to Support Mission Critical Push to Talk over LTE (MCPTT) Services (Release 13), 3GPP TR 23.779 V2.0.0, Sep. 20, 2015, 251 pages.

(Continued)

*Primary Examiner* — Danh C Le
(74) *Attorney, Agent, or Firm* — The Farrell Law Firm, P.C.

(57) ABSTRACT

Embodiments herein provide a method for notifying a state of a plurality of members of one or more Mission Critical Service (MCX) groups to an MCX UE in a MC communication system. The method includes identifying, by the MCX server, state of each member of one or more groups. The method includes categorizing, by the MCX server, plurality of members of one or more groups based on identified state of each member. Further, the method includes notifying, by MCX server, state of plurality of members of the one or more groups to the MCX UE based on the categorization. The MCX services include MCData, MCPTT (Voice) and MCVideo communication services. In some embodiments, the state of the members of the MCX (Continued)

groups is notified over an eMBMS channel. In various embodiments, the state of members of MCX groups is notified when a Floor is granted to the MCX user.

20 Claims, 3 Drawing Sheets

(51) Int. Cl.
 *H04L 29/06* (2006.01)
 *H04W 4/10* (2009.01)
(58) Field of Classification Search
 USPC .............. 370/329, 310.2; 455/404.1, 567
 See application file for complete search history.

(56) References Cited

U.S. PATENT DOCUMENTS

| | | | | |
|---|---|---|---|---|
| 2015/0289093 A1* | 10/2015 | Petty | ............ | H04L 51/36 709/206 |
| 2015/0359023 A1* | 12/2015 | Stojanovski | ............ | H04W 4/70 370/329 |
| 2015/0373510 A1* | 12/2015 | Stojanovski | ......... | H04B 7/0486 370/312 |
| 2016/0066163 A1* | 3/2016 | Agulnik | ............ | H04W 4/10 455/404.1 |
| 2016/0366567 A1 | 12/2016 | Lee et al. | | |
| 2016/0381528 A1 | 12/2016 | Lee et al. | | |
| 2017/0019816 A1* | 1/2017 | Yuan | ............ | H04W 24/04 |
| 2017/0041768 A1 | 2/2017 | Pattan et al. | | |
| 2017/0171392 A1* | 6/2017 | Yuan | ............ | H04W 76/40 |
| 2017/0339512 A1* | 11/2017 | Wang | ............ | H04L 67/327 |
| 2018/0160277 A1* | 6/2018 | Patel | ............ | H04W 4/10 |
| 2018/0270351 A1* | 9/2018 | Vandikas | ............ | H04M 3/42008 |
| 2018/0286214 A1* | 10/2018 | Wang | ............ | G08B 25/10 |
| 2019/0069141 A1* | 2/2019 | Rolland | ............ | H04W 4/06 |

OTHER PUBLICATIONS

European Search Report dated Feb. 24, 2020 issued in counterpart application No. 18803081.1-1218, 8 pages.
PCT/ISA/210 Search Report issued on PCT/KR2018/005575, pp. 3.
PCT/ISA/237 Written Opinion issued on PCT/KR2018/005575, pp. 4.
3GPP TS 22.280 V14.3.0, Mar. 17, 2017, 3rd Generation Partnership Project; Technical Specification Group Services and System Aspects; . . . Mission Critical Services Common Requirements (MCCoRe); Stage 1 (Release 14), Copyright 2017 3GPP Organizational Partners, pp. 89.
3GPP TS 33.179 V13.4.0, Mar. 21, 2017, 3rd Generation Partnership Project; Technical Specification Group Services and System Aspects; . . . Security of Mission Critical Push to Talk (MCPTT) over LTE (Release 13), Copyright 2017 3GPP Organizational Partners, pp. 91.

* cited by examiner

[Fig. 1]
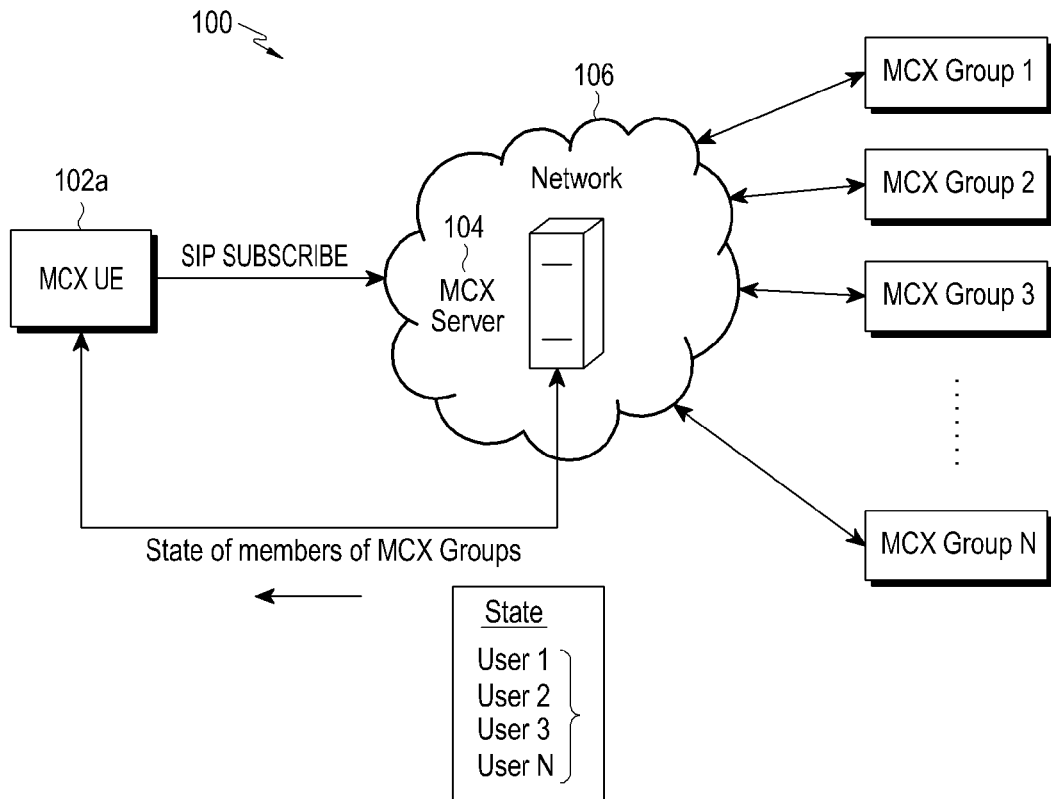
[Fig. 2]
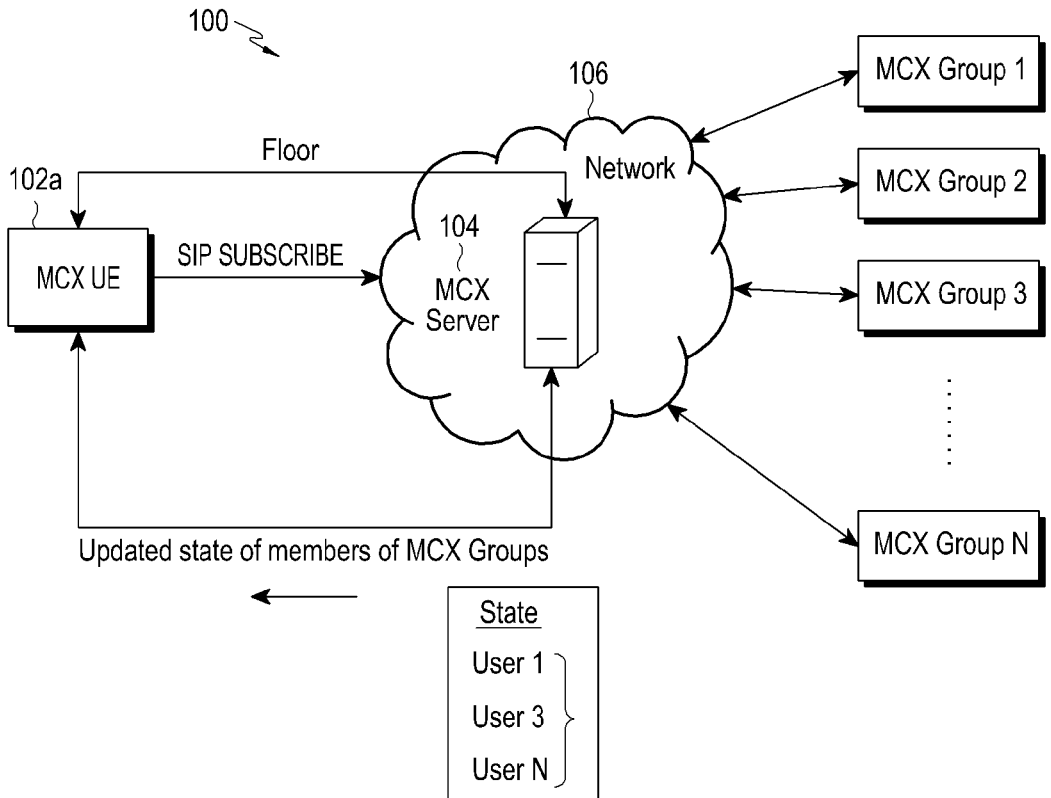

[Fig. 3]
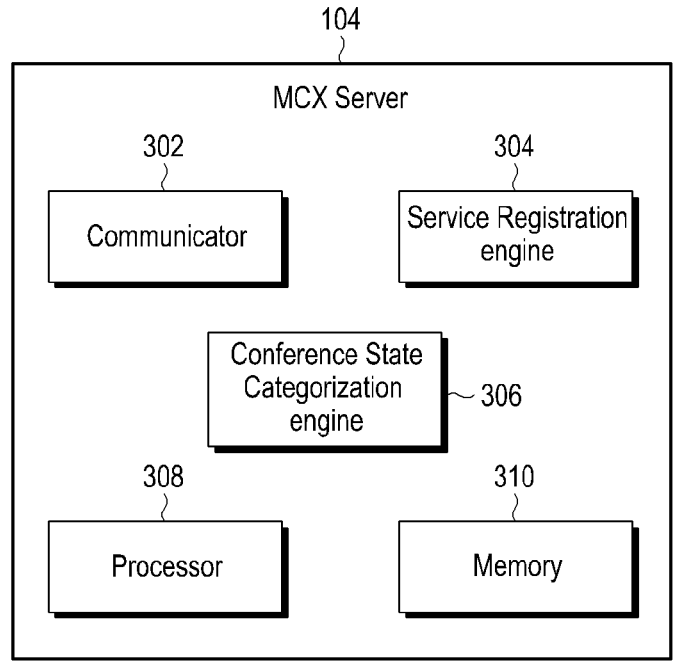
[Fig. 4]
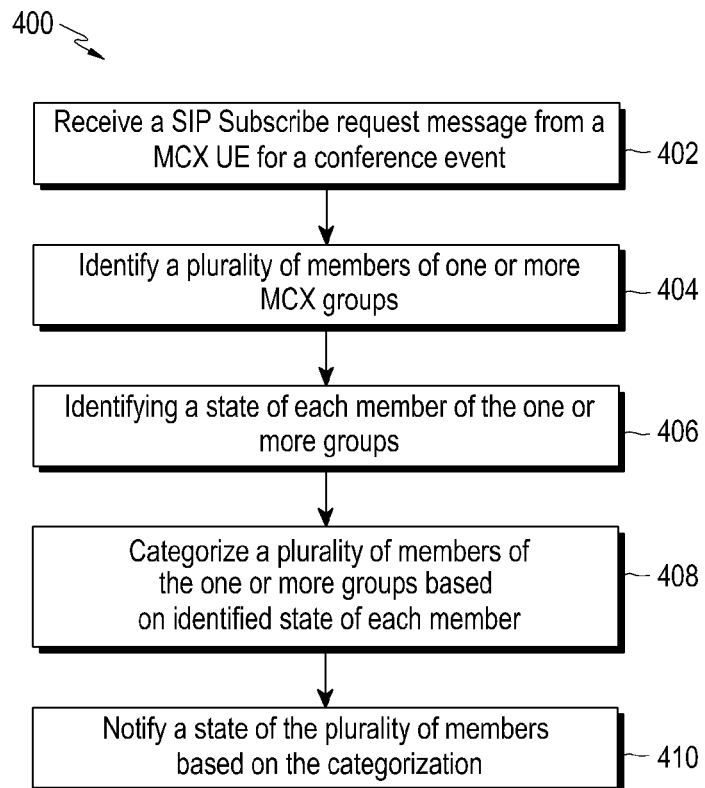

[Fig. 5]
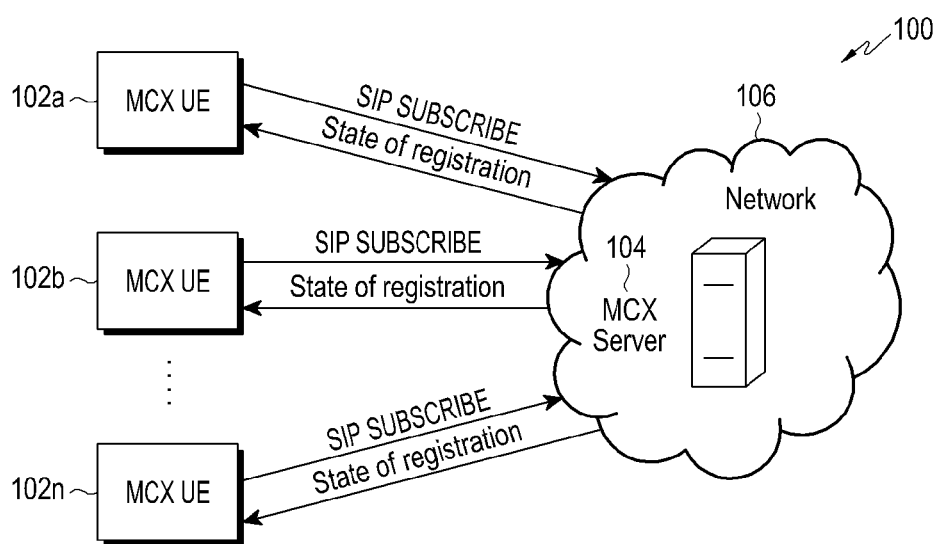
[Fig. 6]
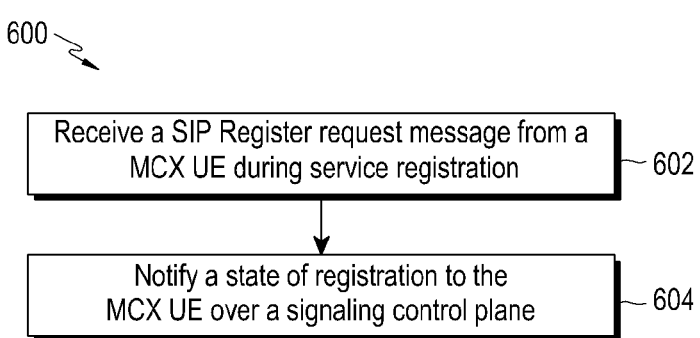

US 10,993,085 B2

METHOD AND SYSTEM FOR NOTIFYING STATE OF MEMBERS OF MISSION CRITICAL SERVICE (MCX) GROUPS

PRIORITY

This application is a National Phase Entry of PCT international Application No. PCT/KR2018/005575, which was filed on May 15, 2018, and claims priority to Indian Provisional Patent Application No. 201741017021 (PS) and Indian Complete Patent Application No. 201741017021 (CS) filed in the Indian Intellectual Property Office on May 15, 2017 and May 11, 2018, respectively, the contents of which are incorporated herein by reference.

BACKGROUND

1. Field

The present disclosure relates to wireless communication systems, and more particularly it is related to a method and system for notifying a state of members of Mission Critical Service (MCX) groups to a MCX UE in a MC communication system.

2. Description of the Related Art

Public safety networks are used for Mission Critical (MC) services (MCX) such as MCData, MCPTT (Voice) and MCVideo communication services. The MC communication services may include defined set of MC services. Such MCX services typically build on existing third generation partnership project (3GPP) transport communication mechanisms provided by the evolved packet system (EPS) architectures to establish, maintain, and terminate the actual communication path(s) among the users. Typically, a MCX server provides centralized support for such MCX services. The MCX server further can facilitate or govern MC communication among various users part of the network.

The MCX server may be an IP Multimedia Subsystem (IMS) application server, but the MCS server may also be a non-IMS based SIP server. User equipment (UEs) may directly attach to the network to receive critical communication services from an MCS server.

Generally, in IMS, traffic over signaling plane is caused when SIP SUBSCRIBE/NOTIFY is generated and transmitted by a UE to the MCX server, whenever there is change in conference state like participants joining and leaving the conference. For e.g., In MCX system when 1000 users join a MCX Group, load on signaling control plane increases, as state of the members of the MCX Groups need to notified to the MCX UE. associated with huge MCX Groups.

The above information is presented as background information only to help the reader to understand the present invention. Applicants have made no determination and make no assertion as to whether any of the above might be applicable as Prior Art with regard to the present application.

SUMMARY

According to an aspect of the embodiments herein is to provide a method and system for notifying a state of members of Mission Critical Service (MCX) groups to an MCX UE in a MC communication system.

According to another aspect of the embodiments herein is to identify the state of each member of the MCX groups.

According to another aspect of the embodiments herein is to categorize, the plurality of members of the MCX groups based on the identified state of each member.

According to another aspect of the embodiments herein is to notify the state of the plurality of members of the MCX groups to the MCX UE based on the categorization.

According to another aspect of the embodiments herein is to provide a method and system for conference optimization for IMS services.

According to another aspect of the embodiments herein is to provide conference schema optimization by changing a schema design to User State centric from User Id centric.

According to another aspect of the embodiments herein is to provide conference schema optimization by using short forms for schema element names.

According to another aspect of the embodiments herein is to provide indexes along with User Ids in a Conference Group document According to another aspect of the embodiments herein is to provide conference schema optimization by using indexes as substitute to User Ids.

According to another aspect of the embodiments herein is to provide Conference Subscription with a SIP header in SIP INVITE and SIP BYE, for SIP signalling.

According to another aspect of the embodiments herein is to provide REGISTER Subscription with a SIP header in SIP REGISTER for SIP signaling.

According to another aspect of the embodiments herein is to notify the state of the members of the MCX groups over an eMBMS channel.

According to another aspect of the embodiments herein is to notify the state of the members of the MCX groups when a Floor is granted to the MCX user, in case of MCX Conference.

According to another aspect of the embodiments herein is to notify the state of the members of the MCX groups in a certain defined location range based on location information of the members.

Accordingly embodiments herein provide a method for notifying a state of a plurality of members of one or more Mission Critical Service (MCX) groups to an MCX UE in a Mission Critical (MC) communication system. The method includes receiving, by a MCX server, a SIP SUBSCRIBE request message for a conference event from the MCX UE. The method includes identifying, by the MCX server, a plurality of members of the one or more MCX groups in response to receiving the SIP SUBSCRIBE request message from the MCX UE. The method includes identifying, by the MCX server, the state of each member of the one or more groups. The method includes categorizing, by the MCX server, the plurality of members of the one or more groups based on the identified state of each member. Further, the method includes notifying, by the MCX server, the state of the plurality of members of the one or more groups to the MCX UE based on the categorization.

In an embodiment, the MCX server notifies the state of the plurality of members of the one or more groups to the MCX UE over a signaling control plane.

In an embodiment, the SIP SUBSCRIBE request message is appended in a SIP INVITE request message as a SIP header (for Implicit conf-event SUBSCRIBE) by the MCX UE.

In an embodiment, the MCX server notifies the state of the plurality of members of the one or more groups to the MCX UE in response to receiving the SIP INVITE request message with the SIP SUBSCRIBE request message as the SIP header.

In an embodiment, the MCX server notifies the state of the plurality of members of the one or more groups to the MCX UE over an Enhanced Multimedia Broadcast Multicast Service (eMBMS) channel.

In an embodiment, the method includes determining, by the MCX server, whether a floor is granted to the MCX UE. Further, the method includes dynamically notifying, by the MCX server, an updated state of the plurality of members of the one or more groups to the MCX UE in response to determining that the floor is granted to the MCX UE.

In an embodiment, the MCX server receives a SIP REGISTER request message for a register event from the MCX UE, wherein the MCX server notifies a registration state of the MCX UE.

In an embodiment, a SIP SUBSCRIBE request message for the register event is appended in the SIP REGISTER request message as a SIP header (for Implicit reg-event SUBSCRIBE) during a MCX service registration by the MCX UE.

In an embodiment, the MCX server notifies the state of the registration to the MCX UE over a signaling control plane.

In an embodiment, short forms for schema element names are provided for conference schema optimization.

In an embodiment, the MCX server 104 identifies the plurality of members of the one or more MCX groups by assigning indexes for the plurality of members. The indexes are associated with the plurality of members in the conference event.

In an embodiment, the indexes are used to represent member Ids in conference schema for further optimization of SIP NOTIFY information to the MCX UE 102a.

In an embodiment, the state of the members of the MCX groups is notified in a certain defined location range based on location information of the members for optimization of SIP NOTIFY information to the MCX UE.

Accordingly embodiments herein provide a Mission Critical Service (MCX) server for notifying a state of a plurality of members of one or more Mission Critical Service (MCX) groups to a MCX UE in a Mission Critical (MC) communication system. The MCX server comprises a conference state categorization engine configured to receive a SIP SUBSCRIBE request message for a conference event from the MCX UE. The conference state categorization engine configured to identify a plurality of members of the one or more MCX groups in response to receiving the SIP SUBSCRIBE request message from the MCX UE. The conference state categorization engine configured to identify the state of each member of the one or more groups. Further, the conference state categorization engine configured to categorize the plurality of members of the one or more groups based on the identified state of each member. Furthermore, the conference state categorization engine configured to notifying the state of the plurality of members of the MCX groups to the MCX UE.

All the embodiments described herein are applicable to MCX as well as non-MCX IMS communications like VoLTE, RCS, etc.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

This method is illustrated in the accompanying drawings, throughout which reference letters indicate corresponding parts in the various figures. The embodiments herein will be better understood from the following description with reference to the drawings, in which:

FIG. 1 illustrates an example Mission Critical (MC) communication system in which a MCX server notifies a state of a plurality of members of MCX groups to a MCX User Equipment (UE), according to an embodiment as disclosed herein;

FIG. 2 illustrates an example MC communication system in which the MCX server notifies an updated state of the plurality of members of MCX groups when a floor is granted to the MCX UE, according to an embodiment as disclosed herein;

FIG. 3 illustrates various hardware components of the MCX server for notifying the state of the plurality of members of the MCX groups, according to an embodiment as disclosed herein;

FIG. 4 is a flow chart illustrating a method for notifying the state of the plurality of members of the MCX groups to the MCX UE, according to an embodiment as disclosed herein;

FIG. 5 is another example MC communication system in which the MCX server notifies a state of registration to MCX UE(s), according to an embodiment as disclosed herein; and FIG. 6 is a flow chart illustrating a method for notifying the state of registration to the MCX UE, according to an embodiment as disclosed herein.

DETAILED DESCRIPTION

The embodiments herein and the various features and advantageous details thereof are explained more fully with reference to the non-limiting embodiments that are illustrated in the accompanying drawings and detailed in the following description. The various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

Accordingly embodiments herein achieve a method and system for notifying a state of a plurality of members of one or more Mission Critical Service (MCX) groups to a MCX User Equipment (UE) in a Mission Critical (MC) communication system. The method includes receiving, by an MCX server, a SIP SUBSCRIBE request message for a conference event from the MCX UE. The method includes identifying, by the MCX server, a plurality of members of the one or more MCX groups in response to receiving the SIP SUBSCRIBE request message from the MCX UE. The method includes identifying, by the MCX server, the state of each member of the one or more groups. The method includes categorizing, by the MCX server, the plurality of members of the one or more groups based on the identified state of each member. Further, the method includes notifying, by the MCX server, the state of the plurality of members of the one or more groups to the MCX UE based on the categorization.

In an embodiment, short forms for various schema elements such as endpoint entity as "ep e", display text as "dt" and so on are provided for schema element names for conference schema optimization In some embodiments, the MCX server 104 identifies the plurality of members of the one or more MCX groups by assigning indexes for the plurality of members. The indexes are associated with the plurality of members in the conference event.

The indexes are used to represent member Ids in conference schema for further optimization of SIP NOTIFY information to the MCX UE 102a.

In various embodiments, the state of the members of the MCX groups is notified in a pre-defined location range based on location information of the members for optimization of SIP NOTIFY information to the MCX UE.

The proposed method can be used to provide conference optimization in the MC communication system. The method includes providing the conference schema optimization by changing schema design from User Id-centric schema to user state-centric. Hence the state-centric schema reduces the bandwidth consumption by 65% as the redundant information is eliminated.

In various embodiments, the proposed method includes implicit conference Subscription by appending a SIP header in SIP INVITE and SIP BYE for SIP Signalling.

In some embodiments, the method includes notifying a registration state of the MCX UE. The MCX server receives a SIP REGISTER request message for a register event from the MCX UE. The SIP REGISTER request message includes a SIP SUBSCRIBE request message for the register event which is appended in the SIP REGISTER request message. The MCX server notifies the state of the registration to the MCX UE over a signaling control plane.

Referring now to the drawings, and more particularly to FIGS. 1 through 6, there are shown preferred embodiments.

FIG. 1 illustrates an example Mission Critical (MC) communication system 100 in which an MCX server notifies a state of a plurality of members of MCX groups to a MCX User Equipment (UE), according to an embodiment as disclosed herein. As depicted in FIG. 1, the MC communication system 100 includes a MCX UE 102a, a MC Service (X), MCX server 104 in a network 106 and a plurality of MCX groups namely MCX Group 1, MCX Group 2, MCX Group 3 and so on to MCX group N. Although, there is only one MCX UE 102a shown in the MC communication system 100, it should be noted that there can be many MCX UEs 102a-102n in the MCX communication system 100. In the present disclosure, the 'X' represents various services supported by the MCX server and the MCX UEs 102a-102n in the MC communication system 100 such as a MCPTT service, MCVideo service and MCData service or the like.

The MCX server 104 serves as a centralized server to enable the network 106 to provide MCX services to MCX UEs 102a-102n. In various embodiments of the present disclosure, it should be noted that the Mission Critical Service (MCS) may support an enhanced mission critical push-to-talk (MCPTT) service, an enhanced mission critical video (MCVIDEO) service, an enhanced mission critical data/message (MCDATA) service, or the like. An MCS service may be suitable for mission critical scenarios and may be based upon 3GPP EPS services. The MCS may typically be a session initiation protocol (SIP) based service that may be provided through the centralized MCX server 104 residing in the network 106 (e.g., a 3GPP EPS network). The MCX server 104 may be an IP Multimedia Subsystem (IMS) application server, but the MCS server may also be a non-IMS based SIP server. User equipment (UEs) may directly attach to the network to receive critical communication services from an MCS server.

In some examples, the network 106 includes 3GPP E-UTRAN access elements (not shown) and 3GPP E-UTRAN core elements (not shown). For example, the transmitting MCX UE 102a gains access to the network 106 through a LTE-Uu interface (not shown) or through an evolved Node B (eNB, not shown). Further, the MCX server 104 may couple to various access/core elements of the network 106. For example, the MCX server 104 can couple to a serving gateway/packet data gateway through one or more suitable interface reference points. Various core elements such as mobile management entity (MME) and multimedia broadcast/multicast service gateway (MBMS GW) may provide core 3GPP E-UTRAN services to the MCX server 104 and/or the MCX UEs 102a-102n, to facilitate MCX communication services by the network 106.

For example, the MCX UEs 102a-102n can be for e.g., an electronic device, a User Equipment (UE), or the like. Each of the MCX UEs 102a-102n can include a MCX client (i.e., an application) for communicating with the MCX server 104. The first MCX UE 102a includes a first MCX client; the second MCX UE 102b includes a second MCData client and so on. Thus, it should be noted that the MCX server 104 provides centralized support for MCX services suite.

The MCX Groups 1 to N represents various MC service groups such as for example but not limited to a fire group, Ambulance group, medical group or the like. For example, the MCPTT Service may support a minimum of 500,000 MCPTT Groups. An authorized MCPTT UE can be an MCPTT member of at least 5,000 MCPTT Groups.

Each of the MCX group includes members affiliated to that MCX group. For example, the MCPTT Service may support a minimum of 2000 MCPTT Users within an MCPTT Group or a combination of different MCPTT Groups.

Referring to FIG. 1, the MCX UE 102a according to an exemplary embodiment may provide the MCPTT service in an LTE-based public safety network, which is called a public safety LTE (hereinafter referred to as PS-LTE). The MCPTT service may support one-to-one and one-to-many voice/video communications.

Initially, the MCX UE 102a may transmit a SIP REGISTER message to a SIP core through the IMS network. If the SIP REGISTER message is received, the MCX server 104 may check the MCX UE 102a information included in the SIP REGISTER message to determine whether to register the MCX UE 102a with the MCX server 104. The MCX server 104 performs authentication based on the information included in the SIP REGISTER message.

After the registration is completed, the MCX UE 102a joins multiple groups to which it belongs by sending a SIP Invite and for each group which the MCX UE 102a has joined successfully, the MCX UE 102a sends a SIP SUBSCRIBE request message to the MCX server 104 for the conference event. When the MCX server 104 receives the SIP SUBSCRIBE request message, the MCX server 104 identifies members of the one or more MCX groups.

In an embodiment, the SIP SUBSCRIBE request message is appended in a SIP INVITE request message as a SIP header by the MCX UE. In such case, the MCX UE 102a transmits the SIP SUBSCRIBE request message in the SIP INVITE request message.

In an embodiment, for Implicit Conference Subscription, the SIP Header for implicit conference subscription includes the following:

Header Name: Invite-Sub

Compact Form: None

The syntax of the header field follows the BNF as defined below:

Invite-Sub="Invite-Sub" HCOLON invite-sub-value* (SEMI exten)

invite-sub-value="true"/"false"

exten=generic-param generic-param=token [EQUAL gen-value]

gen-value=token/host/quoted-string where the syntax of generic-param is defined in 3261 true: trigger implicit subscribe false: no implicit subscribe is requested, or equivalent to INVITE The proposed method provides a SIP option tag namely, "noinvitesub", which is added to the SIP Option Tags sub-registry in the SIP Parameters Registry. It is defined as:

Name: No-invite sub

Description: This SIP option tag specifies a User Agent ability of accepting an INVITE request without establishing an implicit subscription.

Conventionally 'BYE' is used to terminate implicit subscription with and without SIP FINAL NOTIFY by adding extension in Invite-Sub header as defined below:

extension=nosipnotify

With the proposed 'BYE', this extension informs the UA processing the request to terminate the dialog without sending FINAL NOTIFY to requester. The absence of this extension in BYE shall inform the UA processing the request to terminate the dialog by sending FINAL NOTIFY to requester.

Further, the proposed method can be utilized to provide a simplification in terms of call flow. Consider a scenario of 1000 participants in MCPTT with SIP INVITE performing implicit SUBSCRIBE. In such cases, 1000 SUBSCRIBEs are avoided over network. Thus, the implicit subscription leads to reduction in number of SIP messages to the MCX server 104.

In an embodiment, the MCX server 104 identifies the state of each member of the one or more groups (i.e., MCX group 1 to MCX group N). Further, the MCX server 104 categorizes the plurality of members of the one or more groups based on the identified state of each member.

In an example, the MCX server 104 categorizes the state of the plurality of the members of the MCX groups as mentioned below. Although members of the MCX groups shown in the below example are less, it should be noted that the state of the all the members of the MCX groups are categorized based on status of each member as shown below.

conference-info entity="tel:+829009000" state="full">
<!----Connected User-->
<users status="connected" state="full">
<ep e="tel:+825000001" dt="MCPTT-User-01"/>
<ep e="tel:+825000002" dt="MCPTT-User-02"/>
<ep e="tel:+825000003" dt="MCPTT-User-03"/>
<ep e="tel:+825000004" dt="MCPTT-User-04"/>
<ep e="tel:+825000005" dt="MCPTT-User-05"/>
<ep e="tel:+825000006" dt="MCPTT-User-06"/>
<ep e="tel:+825000007" dt="MCPTT-User-07"/>
<ep e="tel:+825000008" dt="MCPTT-User-08"/>
<ep e="tel:+825000009" dt="MCPTT-User-09"/>
<ep e="tel:+825000010" dt="MCPTT-User-10"/>
</users>
<!----Disconnected User-->
<users status="disconnected" dm="departed" state="full">
<ep e="tel:+825000011"/>
<ep e="tel:+825000012"/>
<ep e="tel:+825000013"/>
<ep e="tel:+825000014"/>
<ep e="tel:+825000015"/>
</users>
<users status="disconnected" dm="booted" state="full">
<ep e="tel:+825000016"/>
<ep e="tel:+825000017"/>
<ep e="tel:+825000018"/>
<ep e="tel:+825000019"/>
<ep e="tel:+825000020"/>
</users>
<!----Pending User-->
<users status="pending" state="full">
<ep e="tel:+825000021"/>
<ep e="tel:+825000022"/>
<ep e="tel:+825000023"/>
<ep e="tel:+825000024"/>
<ep e="tel:+825000025"/>
<ep e="tel:+825000026"/>
<ep e="tel:+825000027"/>
<ep e="tel:+825000028"/>
<ep e="tel:+825000029"/>
<ep e="tel:+825000030"/>
</users>

In an embodiment, short forms for various elements such as endpoint entity as "ep e", display text as "dt" and so on are provided for schema element names for conference schema optimization.

In an embodiment, the MCX server 104 identifies the plurality of members of the one or more MCX groups by assigning indexes for the plurality of members. The indexes are associated with the plurality of members in the conference event.

In an embodiment, the indexes are used to represent member Ids in conference schema for further optimization of SIP NOTIFY information to the MCX UE 102a.

In another example, the MCX server 104 categorizes the state of the plurality of the members as mentioned below.

<conference-info entity="tel:+829009000" state="full">
<!----Connected User-->
<users status="connected" state="full">
<endpoint entity="tel:+825000001" display-text="MCPTT-User-01"/>
<endpoint entity="tel:+825000002" display-text="MCPTT-User-02"/>
<endpoint entity="tel:+825000003" display-text="MCPTT-User-03"/>
<endpoint entity="tel:+825000004" display-text="MCPTT-User-04"/>
<endpoint entity="tel:+825000005" display-text="MCPTT-User-05"/>
<endpoint entity="tel:+825000006" display-text="MCPTT-User-06"/>
<endpoint entity="tel:+825000007" display-text="MCPTT-User-07"/>
<endpoint entity="tel:+825000008" display-text="MCPTT-User-08"/>
<endpoint entity="tel:+825000009" display-text="MCPTT-User-09"/>

```
    <endpoint    entity="tel:+825000010"    display-
text="MCPTT-User-10"/>
  </users>
  <!----Disconnected User-->
  <users    status="disconnected"    disconnection-
method="departed" state="full">
    <endpoint entity="tel:+825000011"/>
    <endpoint entity="tel:+825000012"/>
    <endpoint entity="tel:+825000013"/>
    <endpoint entity="tel:+825000014"/>
    <endpoint entity="tel:+825000015"/>
  </users>
  <users    status="disconnected"    disconnection-
method="booted" state="full">
    <endpoint entity="tel:+825000016"/>
    <endpoint entity="tel:+825000017"/>
    <endpoint entity="tel:+825000018"/>
    <endpoint entity="tel:+825000019"/>
    <endpoint entity="tel:+825000020"/>
  </users>
  <!----Pending User-->
  <users status="pending" state="full">
    <endpoint entity="tel:+825000021"/>
    <endpoint entity="tel:+825000022"/>
    <endpoint entity="tel:+825000023"/>
    <endpoint entity="tel:+825000024"/>
    <endpoint entity="tel:+825000025"/>
    <endpoint entity="tel:+825000026"/>
    <endpoint entity="tel:+825000027"/>
    <endpoint entity="tel:+825000028"/>
    <endpoint entity="tel:+825000029"/>
    <endpoint entity="tel:+825000030"/>
  </users>
</conference-info>
```

Further, the MCX server 104 notifies the MCX UE the state of the plurality of members of the one or more groups to the MCX UE 102a based on the categorization as shown in the above example. The MCX server 104 notifies the state of the plurality of members of the one or more groups to the MCX UE 102a over signaling control plane.

In an embodiment, the MCX server 104 notifies the state of the plurality of members of the one or more groups to the MCX UE 102a over an Enhanced Multimedia Broadcast Multicast Service (eMBMS) channel, when available. In such case, the MCX server 104 notifies the state of the plurality of members over the eMBMS channel.

In another embodiment, the state of the members of the MCX groups is notified in a pre-defined location range based on location information of the members for optimization of SIP NOTIFY information to the MCX UE.

With the proposed method, by utilizing Optimized Conference XML Schema, the bandwidth consumption can be optimized, as 65% redundant information is eliminated. Thus, the proposed method can be used to provide better user experience (due to reduced latency). With 65% conference information being reduced, it takes less time for MCX server 104 to compose the state information of the members of the MCX groups and also at the MCX UE 102a, the time taken for rendering the state of the plurality of members of the groups can be reduced.

FIG. 2 illustrates an example MC communication system 100 in which the MCX server 104 notifies an updated state of the plurality of members of MCX groups when a floor is granted to an MCX User Equipment (UE), according to an embodiment as disclosed herein. As depicted in FIG. 2, the MCX server 104 determines whether a floor is granted to the MCX UE 102a. When the MCX server 104 determines that the floor is granted to the MCX UE, the MCX server 104 notifies the updated state of the plurality of members of the one or more MCX groups to the MCX UE 102a. The updated state of the members of the MCX groups includes the members who are in connected state, disconnected state, pending state or the like.

Unlike, to the conventional system, instead of receiving members or participants state from the MCX server 104, when there is a change in state of members irrespective of Floor state, the proposed method allows the MCX server 104 to transmit the updated state Information only when the Floor is in Granted/Taken and if there is any change in participant/member state.

Unlike, to the conventional system, instead of receiving members or participants state from the MCX server 104, when there is a change in state of members irrespective of location, the proposed method allows the MCX server 104 to transmit the updated state Information only when there is any change in participant/member state in a certain defined location range.

FIG. 3 illustrates various hardware components of the MCX server 104 for notifying the state of the plurality of members of the MCX groups, according to an embodiment as disclosed herein. As depicted in FIG. 3, the MCX server 104 includes a communicator 302, a service registration engine 304, a conference state categorization engine 306, a processor 308 and a memory 310.

In an embodiment, the communicator 302 can be configured to transmit one or more SIP signalling messages to a plurality of MCX UEs in the MCX groups. The SIP signalling messages can include but not limited to SIP INVITE, SIP SUBSCRIBE, SIP REGISTER or the like. The communicator 302 may be a transceiver.

The service registration engine 304 can be configured to receive a SIP REGISTER request message from MCX UEs 102a-102n while registering to one or more MCX services in the MC communication system 100.

In an embodiment, the service registration engine 304 can be configured to receive the SIP REGISTER request message for a register event from the MCX UE 102a.

In another embodiment, the service registration engine 304 can be configured to receive the SIP REGISTER request message with a SIP SUBSCRIBE request appended in the SIP REGISTER request message during a MCX service registration In some embodiments, the service registration engine 304 can be configured to notify the state of the registration to the MCX UE over a signaling control plane. The state of registration includes various services to which the MCX UE has performed the service registration.

The conference state categorization engine 306 can be configured to identify the state of each member of the one or more groups. Further, the conference state categorization engine 306 can be configured to categorize the members of the MCX groups based on the identified state of each member. The categorization is performed by the conference state categorization engine 306 based on the state of each member.

In the conventional system, the information about every member/user is presented as below (which is user centric):
```
user entity="tel:+825000010" state="full">
  <endpoint entity="tel:+825000010">
  <display-text>MCPTT-User-10</display-text>
  <status>connected</status>
```

With the proposed method, the conference state categorization engine 306 can be configured to identify the state of each member of the one or more groups and performs categorization of the members of the MCX groups based on the identified state of each member. Thus, the conference state categorization engine 306 can be configured to categorize the information of 10 members as mentioned below:

```
<users status="connected" state="full">
  <ep e="tel:+825000001" dt="MCPTT-User-01"/>
  <ep e="tel:+825000002" dt="MCPTT-User-02"/>
  <ep e="tel:+825000003" dt="MCPTT-User-03"/>
  <ep e="tel:+825000004" dt="MCPTT-User-04"/>
  <ep e="tel:+825000005" dt="MCPTT-User-05"/>
  <ep e="tel:+825000006" dt="MCPTT-User-06"/>
  <ep e="tel:+825000007" dt="MCPTT-User-07"/>
  <ep e="tel:+825000008" dt="MCPTT-User-08"/>
  <ep e="tel:+825000009" dt="MCPTT-User-09"/>
  <ep e="tel:+825000010" dt="MCPTT-User-10"/>
```

Consider a scenario, when a MCX user joins a conference, with existing XML schema for conference event with 1000 members. With the conventional system of notifying state with use centric information will take huge time for receiving the state from the MCX server 104.

The proposed method can be utilized to significantly reduce the IMS traffic over signaling plane. Thus, with the proposed method, by utilizing Optimized Conference XML Schema, the bandwidth consumption can be optimized, as 65% redundant information can be eliminated.

In an embodiment, the conference state categorization engine 306 can be configured to associate indexes as substitute to User Ids in conference schema for further optimization of SIP NOTIFY information to the MCX UE 102a. In an embodiment, the conference state categorization engine 306 can be configured to notify the state of the members of the MCX groups to the MCX UE based on the categorization as described above.

The processor 308 (for example; a hardware unit, an apparatus, a Central Processing Unit (CPU), a Graphics Processing Unit (GPU), etc.) communicatively coupled to a memory 310 (e.g., a volatile memory and/or a non-volatile memory); the memory 310 includes storage locations configured to be addressable through the processor 308.

In an embodiment, the memory 408 can be configured to store the state of the members of the MCX groups. The memory 408 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 408 may, in some examples, be considered a non-transitory storage medium. The term "non-transitory" may indicate that the storage medium is not embodied in a carrier wave or a propagated signal. However, the term "non-transitory" should not be interpreted that the memory 408 is non-movable. In some examples, the memory 408 can be configured to store larger amounts of information than the memory. In certain examples, a non-transitory storage medium may store data that can, over time, change (e.g., in Random Access Memory (RAM) or cache).

FIG. 4 is a flow chart 400 illustrating a method for notifying the state of the plurality of members of the MCX groups to the MCX UE, according to an embodiment as disclosed herein. The various steps of the flow chart 400 are performed by the conference state categorization engine 306 in the MCX server 104.

At step 402, the method includes receiving the SIP SUBSCRIBE request message from the MCX UE 102a for the conference event.

At step 404, the method includes identifying the plurality of members of the one or more MCX groups.

At step 406, the method includes identifying the state of each member of the one or more groups.

At step 408, the method includes categorizing the members of the MCX groups based on identified state of each member.

At step 410, the method includes notifying the state of the plurality of members based on the categorization.

FIG. 5 is another example MC communication system 100 in which the MCX server 104 notifies a state of registration to MCX UE(s), according to an embodiment as disclosed herein. As depicted in FIG. 5, the MCX server 104 receives a SIP REGISTER request message from MCX UEs 102a-102n while registering to one or more MCX services in the MC communication system 100. The SIP REGISTER request message is received from the MCX UEs 102a-102n for the register event.

In an embodiment, the MCX server 104 receives the SIP REGISTER request message with the SIP SUBSCRIBE request appended in the SIP REGISTER request message during the MCX service registration.

Further, the MCX server 104 notifies the state of the registration to the MCX UE over the signaling control plane as shown in FIG. 5. The state of registration includes various services to which the MCX UEs 102a-102n has performed the service registration.

FIG. 6 is a flow chart 600 illustrating a method for notifying the state of the registration to the MCX UE 102, according to an embodiment as disclosed herein. The various steps of the flow chart 600 are performed by the service registration engine 304 in the MCX server 104.

At step 602, the method includes receive the SIP Register request message from the MCX UEs 102a-102n during service registration.

At step 604, the method includes notifying the state of registration to the MCX UE over the signaling control plane.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method for notifying a state of a plurality of members of one or more mission critical service, MCX, groups to an MCX user equipment, UE, in a mission critical, MC, communication system, the method comprising:
    receiving, by an MCX server, a session initiation protocol, (SIP), subscribe request message for a conference event from the MCX UE;
    identifying, by the MCX server, a plurality of members of the one or more MCX groups in response to receiving the SIP subscribe request message from the MCX UE;
    identifying, by the MCX server, the state of each member of the one or more groups;

categorizing, by the MCX server, the plurality of members of the one or more groups based on the identified state of each member; and notifying, by the MCX server, the state of the plurality of members of the one or more groups to the MCX UE based on the categorization.

2. The method of claim 1, wherein the MCX server notifies the state of the plurality of members of the one or more groups to the MCX UE over a signaling control plane.

3. The method of claim 1, wherein the SIP subscribe request message is appended in a SIP invite request message as a SIP header by the MCX UE.

4. The method of claim 3, wherein the MCX server notifies the state of the plurality of members of the one or more groups to the MCX UE in response to receiving the SIP invite request message with the SIP subscribe request message as the SIP header.

5. The method of claim 1, wherein the MCX server notifies the state of the plurality of members of the one or more groups to the MCX UE over an enhanced multimedia broadcast multicast service, eMBMS, channel.

6. The method of claim 1, wherein the method further comprises:
determining, by the MCX server, whether a floor is granted to the MCX UE; and
dynamically notifying, by the MCX server, an updated state of the plurality of members of the one or more groups to the MCX UE in response to determining that the floor is granted to the MCX UE.

7. The method of claim 1, wherein the MCX server identifies the plurality of members of the one or more MCX groups by assigning indexes for the plurality of members, wherein the indexes are associated with the plurality of members in the conference event.

8. The method of claim 1, wherein the MCX server notifies the state of the members of the one or more MCX groups in a pre-defined location range based on location information of the members.

9. The method of claim 1, wherein the MCX server receives a SIP register request message for a register event from the MCX UE, wherein the MCX server notifies a registration state of the MCX UE.

10. The method of claim 9, wherein a SIP subscribe request message for the register event is appended in the SIP register request message during a MCX service registration by the MCX UE.

11. The method of claim 9, wherein the MCX server notifies the state of the registration to the MCX UE over a signaling control plane.

12. A mission critical service, MCX, server for notifying a state of a plurality of members of one or more (MCX) groups to an MCX UE in a mission critical, MC, communication system, the MCX server comprising:
a communicator configured to transmit or to receive signal; and
a controller configured to:

receive a session initiation protocol,(SIP), subscribe request message for conference event from the MCX UE;
identify a plurality of members of the one or more MCX groups in response to receiving the SIP subscribe request message from the MCX UE;
identify the state of each member of the one or more groups;
categorize the plurality of members of the one or more groups based on the identified state of each member; and
notify the state of the plurality of members of the one or more groups to the MCX UE based on the categorization.

13. The MCX server of claim 12, wherein the MCX server notifies the state of the plurality of members of the one or more groups to the MCX UE over a signaling control plane.

14. The MCX server of claim 12, wherein the SIP subscribe request message is appended in a SIP invite request message as a SIP header by the MCX UE.

15. The MCX server of claim 14, wherein the MCX server notifies the state of the plurality of members of the one or more groups to the MCX UE in response to receiving the SIP invite request message with the SIP subscribe request message as the SIP header.

16. The MCX server of claim 12, wherein the MCX server notifies the state of the plurality of members of the one or more groups to the MCX UE over an enhanced multimedia broadcast multicast service, eMBMS, channel.

17. The MCX server of claim 12, wherein the controller is further configured to:
determine whether a floor is granted to the MCX UE; and
dynamically notify an updated state of the plurality of members of the one or more groups to the MCX UE in response to determining that the floor is granted to the MCX UE.

18. The MCX server of claim 12, wherein the MCX server identifies the plurality of members of the one or more MCX groups by assigning indexes for the plurality of members,
wherein the indexes are associated with the plurality of members in the conference event, and
wherein the MCX server notifies the state of the members of the one or more MCX groups in a pre-defined location range based on location information of the members.

19. The MCX server of claim 12, wherein the MCX server receives a SIP register request message for a register event from the MCX UE, wherein the MCX server notifies a registration state of the MCX UE.

20. The MCX server of claim 19, wherein a SIP subscribe request message for the register event is appended in the SIP register request message during a MCX service registration by the MCX UE, and
wherein the MCX server notifies the state of the registration to the MCX UE over a signaling control plane.

* * * * *